H. P. KRAFT.
GAGE AND PUMP CONNECTION.
APPLICATION FILED APR. 3, 1919.
1,374,578.
Patented Apr. 12, 1921.
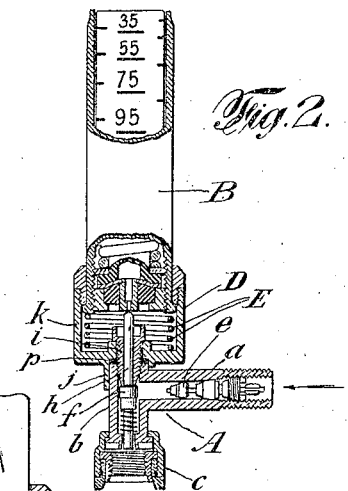
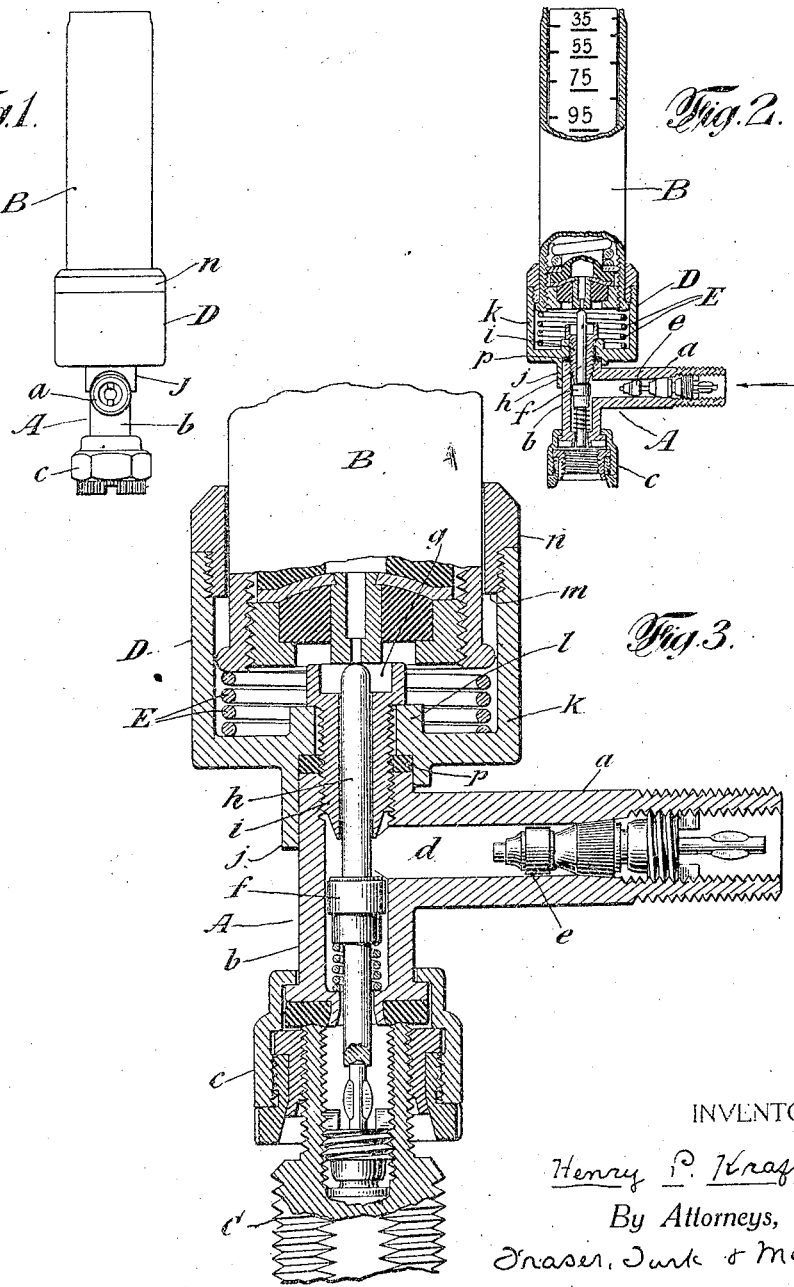
INVENTOR
Henry P. Kraft,
By Attorneys,
Fraser, Jurk & Myers

UNITED STATES PATENT OFFICE.

HENRY P. KRAFT, OF RIDGEWOOD, NEW JERSEY, ASSIGNOR TO A. SCHRADER'S SON, INCORPORATED, OF BROOKLYN, NEW YORK, A CORPORATION OF NEW YORK.

GAGE AND PUMP CONNECTION.

1,374,578.

Specification of Letters Patent.

Patented Apr. 12, 1921.

Application filed April 3, 1919. Serial No. 297,130.

*To all whom it may concern:*

Be it known that I, HENRY P. KRAFT, a citizen of the United States of America, residing in Ridgewood, in the county of Bergen, and State of New Jersey, have invented certain new and useful Improvements in Gages and Pump Connections, of which the following is a specification.

This invention provides an attachment whereby a pressure gage may be applied to a pump coupling for pneumatic tire valves.

Pump couplings are common for connecting the pump hose to the tire valve, having a swivel screw union or coupling proper for engaging the threaded nipple of the tire valve, with two internal check valves, the one between the air inlet from the hose and the coupling, and the other between the coupling and a branch outlet adapted to receive a tire gage; so that after pumping, the pressure may be taken by applying a gage adapted to unseat the latter check valve and through it to depress the deflating stem of the tire valve to admit pressure from the tire to the gage. This, being done without detaching the pump coupling, facilitates the continued pumping in of air if the pressure becomes insufficient. Such a pump connection is set forth in Patent No. 1,297,741, dated March 18, 1919, and in applications filed June 26, 1917, Serial No. 177,005, and filed June 30, 1917, Serial No. 178,027.

In my application No. 174,864, filed June 15, 1917, is set forth a connection for uniting a tire gage to a pump line or pump connection in such manner that the operation of taking a gage reading, above described, may be performed, while yet the gage is so connected that it cannot become detached or lost without at least a special operation for disengaging it from the connection. To this end the gage is held in a fitting wherein it has a sliding or telescopic movement, a spring being interposed to hold it normally out of engaging relation; upon bodily pressing down the gage against the yielding spring, it engages the check valve controlling the outlet to the gage and permits pressure to enter the gage.

The present invention introduces certain improvements on the construction set forth in said last-named application, when applied to a pump connection such as set forth in the three earlier applications first-above named. The nature of the invention will be made apparent as the description proceeds.

Figure 1 of the accompanying drawings is an elevation of the gage and connection;

Fig. 2 is a side view mainly in vertical mid-section.

Fig. 3 is a fragmentary view on an enlarged scale, showing the pump coupling united to the tire valve, with the gage depressed to take a reading.

Referring to the drawings, A designates, as a whole, the pump connection, B the gage, and C the tire valve.

The pump connection A comprises as heretofore, an inlet branch $a$ to which the hose leading from the pump is attached, a vertical branch $b$, a swivel screw coupling $c$, of usual construction, for screwing on the threaded neck or nipple of the tire valve, the inner duct or conduit $d$ having a check valve $e$ in the branch $a$, and the branch $b$ containing a check valve $f$ for closing the outlet $g$ leading from said branch to the gage. The latter check valve has a long stem $h$, the lower end of which is adapted to enter the screw coupling $c$, while its upper end projects through a nipple $i$ which is screwed into the upper part of the shell, and the upper end of the stem $h$ normally projects considerably above the top of this nipple, so that when the gage is pressed down it may be forced down thereby to unseat the valve $f$, and in turn to press down the deflating stem of the tire valve and unseat the check valve in the latter to admit air pressure from the tire to the gage.

According to the present invention, a gage connection D is attached to the pump connection A in such manner as to connect the gage B to the pump connection. In the construction shown, this gage connection has a neck $j$ which embraces the upright branch $b$ of the pump connection, and comprises a cup-shaped portion $k$ having an internal hub $l$, and with its outer wall forming within it a chamber sufficiently large to receive the flanged foot of the gage B. To retain the gage, the upper portion of the cup is formed with an inturned flange $m$ which normally engages the foot flange of the gage, as shown in Fig. 2. While other constructions are admissible, it is preferable to form this confining flange $m$ upon a separate ring $n$ which screws into the top of the cup $k$, being slipped over the gage after the latter is applied within the cup. Within the cup is a spring E which normally presses up the gage to inactive position, as shown in Fig. 2.

In pumping up the tire the check valve $f$ is closed and the gage elevated, as shown in Fig. 2, and the entering air from the pump unseats the check valve $e$. When the tire is thought to be sufficiently inflated, the pumping is stopped and a gage reading is taken by bodily pressing down the gage to the position shown in Fig. 3. At this time the check valve $e$ will normally be seated, and the depression of the gage pushes down the valve stem $h$, unseating the check valve $f$ and also opening the tire valve so as to admit pressure from the latter into the gage. If the gage reading shows that the pressure is sufficient, the pump coupling is uncoupled. If it shows that the pressure is insufficient, the gage is released and the pumping operation resumed.

The described operation is the same as will be performed with the construction shown in Fig. 5 of my said application No. 174,864, filed June 15, 1917.

The improved construction provided by the present invention constitutes an attachment which may be added to the ordinary commercial pump connection A, this attachment comprising the gage connection D with its inclosed spring E. This attachment is easily applied to the pump coupling by merely unscrewing from the latter the usual screw nipple $i$, applying connection D in place with its neck $j$ embracing the portion $b$, as shown, and replacing and screwing down tightly the nipple $i$, which has a head or flange sufficiently broad to engage the hub $l$. To make the gage connection airtight, a packing ring or gasket $p$ is interposed.

In the construction shown in my last-named application, the gage connection is made large enough to pass over the gage, and its lower end is threaded to screw upon a threaded base made integral with the air connection. The present construction is better since the sides and bottom of the cup $k$ are integral, the bottom being contracted and having a hub portion or neck for fitting upon the existing standard pump connection.

The gage B shown is the well-known commercial form of Schrader tire gage, being a gage of the straight line or telescopic type. The invention, however is not limited to this particular form or type of gage, the structure being adaptable to other gages by obvious modification in shape or proportion.

I claim as my invention:—

1. The combination with a pump connection, of a gage connection comprising a cup-like structure adapted to receive the base portion of a tire gage, and having a contracted portion adapted to fit upon the pump connection, and means for clamping it thereto.

2. The combination with a pump connection, of a gage connection comprising a cup-like structure shaped for engagement with the pump connection, adapted to embrace the base portion of a tire gage, having an inturned flange for engaging the base flange on such gage, and a spring inclosed therein for pressing up the gage.

3. A gage connection according to claim 2, having its inturned flange formed on a separate ring having a threaded engagement with the upper portion of the cup-like structure.

4. A gage connection according to claim 2, having a hub portion adapted to be clamped between the body of the pump connection and a flanged threaded nipple, and a packing between the hub portion and pump connection.

In witness whereof, I have hereunto signed my name.

HENRY P. KRAFT.